Figure 1:
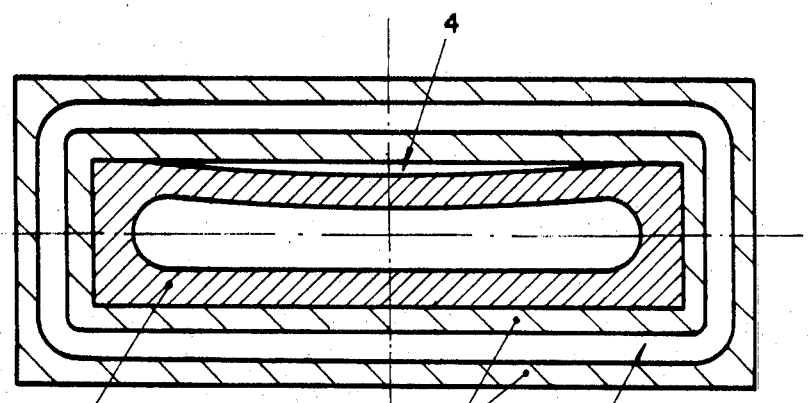

United States Patent [19]

Arena

[11] 4,293,022

[45] Oct. 6, 1981

[54] METHOD FOR CONTINUOUS CASTING OF METAL STRIPS

[76] Inventor: Salvador Arena, Caminho do Mar Ave., 2562 Rudge Ramos, Sao Bernardo do Campo - Sao Paulo, Brazil

[21] Appl. No.: 83,269

[22] Filed: Oct. 10, 1979

Related U.S. Application Data

[63] Continuation-in-part of Ser. No. 859,263, Dec. 9, 1977, abandoned.

[30] Foreign Application Priority Data

Sep. 20, 1977 [BR] Brazil ............................. 7608417

[51] Int. Cl.³ .................. B22D 11/12; B21B 1/24; B21C 47/02
[52] U.S. Cl. .................. 164/476; 29/527.6; 29/527.7; 72/363; 164/417
[58] Field of Search .............. 164/76, 85, 82, 270, 164/417, 442; 148/2; 29/527.7, 527.6; 72/363

[56] References Cited

U.S. PATENT DOCUMENTS

| 1,680,522 | 8/1928 | Jones | 72/363 X |
| 3,191,291 | 6/1965 | Maier | 72/363 X |
| 4,073,333 | 2/1978 | Korshunov et al. | 164/76 X |

FOREIGN PATENT DOCUMENTS

| 1452456 | 4/1969 | Fed. Rep. of Germany | 164/76 |
| 2061286 | 1/1972 | Fed. Rep. of Germany | 164/270 |

Primary Examiner—R. L. Spruill
Assistant Examiner—Gus T. Hampilos
Attorney, Agent, or Firm—Darby & Darby

[57] ABSTRACT

Method for the continuous casting of metal strips or plates utilizing a circular mold for producing continuous semi-tubular members, said members being thereafter flattened to produce the strips or plates.

1 Claim, 2 Drawing Figures

METHOD FOR CONTINUOUS CASTING OF METAL STRIPS

This is a continuation-in-part of my prior copending application Ser. No. 859,263 filed Dec. 9, 1977, now abandoned.

In a conventional method and apparatus for continuous casting of strips or plates, a casting die is provided having an internal hole, or passage, receiving molten material to be cast. The transverse cross-section of the die hole is the same as that of the desired strip or plate, for example, rectangular. The molten material is introduced into the die and drawn therefrom as a strip or plate in the shape of its cross-section. There can be subsequent in-line processing of the strip or plate, such as milling.

The dies used in this type of casting process are generally made of graphite and are housed in a cooling jacket of a suitable heat conducting material, for example, copper, within which a coolant fluid, such as water, circulates. For simplicity that cooling jacket hereafter will be called only JACKET.

When utilizing the method and apparatus of the prior art, it is difficult to obtain a uniform and good quality product due to the irregularity of the thermal contact between the graphite die and the jacket. The graphite die will be called hereafter only DIE.

In the continuous casting art the essential factors for maintaining the uniformity of the process are the:
1. Temperature of the metal entering the mold.
2. Temperatures of all the surfaces of the face of the die in contact with the metal.
3. Exact form of time-speed diagram of the pulling of the cast part.

While the first and third factors can be maintained fairly constant with the modern technology means, the second is practically impossible because temperatures depend directly on the contact of the die with the jacket.

This contact depends, in theory, on the physical distance between the two surface (an apparent paradox because they seem to be in contact), or, in more elementary terms, on the pressure under which the more flexible part, the die, is forced against the jacket.

It must be understood that in a conventional die for continuous-casting strip or plates the outside surface of the die is as flat as the inside face of the jacket.

For reasons of heat transfer the thickness of what can be called wall of the die is relatively small compared to its width. So, in principle, the difficulty inherent to this type of die is maintaining a contact between this relatively thin wall and the jacket, no matter how precisely these surfaces can be originally machined.

One must understand that a copper (or any other metal) jacket and the graphite die are subjected to such assymetries of design and temperatures that they can not maintain their true flat surfaces within the tolerances necessary for a true and uniform contact with the die.

The more important temperature differences are:
1. The die temperature at the upstream end being substantially higher than at the downstream one.
2. The upstream end of the jacket is naturally nearer to the holding furnace is consequently hotter than the downstream end.
3. The side effect, or edge effect, where there is less heat transfer.
4. Basic difference between the temperatures of the face of the cooling water path and of the face of the jacket in contact with the die.

All these differences contribute to an inescapable distortion of the face of the jacket. Even if a hypothetical perfection could be achieved, the distortion of the die wall would jeopardize all this effort.

Even looking superficially one must realize that the die wall is in contact (if any) on one side with the molten metal and on the other with the jacket. In this condition it is absolutely impossible to maintain these two surfaces in contact.

It is superfluous to remember that the heat transfer between two surfaces is highly affected even if the gap is only a few microns. The solution of the problem would be to find a way to force the die wall against the jacket. This is, naturally, within the elastic possibilities of the die material, graphite.

In principle an internal hypothetical pressure (from the die hole) would elastically deform the die wall in a way to conform to the physical shape of the jacket and thus improve greatly and decisively the uniformity of the heat transfer.

Those dedicated to the art of continuous casting of strips or plates, are familiar with the pattern of a cast strip showing the transversal strips that show the location of the solidification zone during the "stopped" part of the pulling cycle.

That pattern is a visible indication of how the solidification is taking place or, in other words, how the heat transfer between the jacket and the die takes place.

These lines are gently bowed in the direction of the holding furnace, naturally because at the edge of the strip the cooling is more "advanced" than at the center.

A further proof that in the conventional art there is not a good reproducibility of the process is the universally high volume of scrap formation. In short, the present art of continuous casting of strips is plagued by poor reproducibility.

One observed and proven fact is that dies with round outside cross sections perform much better than dies with rectangular outside cross sections. The reason is that a round die can be made in such a way as to obtain an arch effect and the internal pressure necessary to force the wall of the die against the jacket. This was the starting point to the development of this process.

There are naturally two ways to obtain the said arch effect between die and jacket:

(a) Making the jacket hole longitudinally conical and also the die outer surface to match. In this way the die can be forced axially to obtain the arch effect.

(b) Shrinking the jacket on the die. This is easily achieved by machining the die outside diameter adequately larger than the jacket hole.

The metallic jacket is then heated by circulating a hot liquid previous to introducing the die.

(c) The combination of both is the best solution by introducing a conical die in a conical jacket to a certain point and then heating the jacket.

A well controlled fit can be obtained by a predetermined further axial introduction of the die.

This invention provides a way to obtain a good continuously cast metal strip or plate by mechanically flattening a continuously cast semi-tubular member.

Another advantage of this invention is that the amount of metal that must be removed by milling for the removal of the skin defects is far smaller than the amount removed in the prior conventional methods because there is no cooling of the mandrel and so no appreciable rupture of the skin in one side of the cast strip forms.

The small cracks on the skin are found only in the outer surface of the tubular member. The inside is practically perfect.

The geometrical advantages of this process are undisputable.

The sizes of the jacket and of the die are $\pi$ times smaller than the flat die of the same strip width. This smaller size of die permits maintaining a more uniform temperature at the inlet of the die within the holding furnace than with a very wide flat die.

Another advantage is the lower cost of the die and the jacket.

In the present invention a mandrel is provided with keys that will slit the tubular member as it is being cast so that the final product will be a split tube.

These keys, two in number, are of utmost importance because they permit the mandrel to "rest" against the inside of the die.

The importance of this design is substantial, especially in a very large die when the mandrel is supported only by a ring and is subjected to forces emanating from the emerging solidified "tube" which are not always perfectly straight. If a big tube is cast by the conventional process, the solidified tube forces the mandrel in one direction or another resulting in a high breakage tendency. The keys provided by this invention permit the construction, with high degree of security, of dies of larger and larger diameters.

The present invention relates to a novel method and apparatus for solving the foregoing problems in connection with the continuous casting of metal plates or strips. In accordance with the invention, it has been discovered that in the continuous casting of a semi-tubular member, the surface quality and deformability characteristics of the product are improved to a degree not found in the conventional continuous casting of rectangular section strips.

Accordingly, the present invention relates to a method and apparatus wherein a metal strip or plate is continuously cast by first casting a semi-tubular member which is thereafter deformed, by a suitable mechanical process, into a strip or plate. In the preferred embodiment of the invention, the casting dies are circular thereby providing a dependable thermal contact between the die and the jacket.

A further object is to provide a method and apparatus for the continuous casting of metal strips or plates in which the initial casting takes place in the form of a semi-tubular member and the members are thereafter deformed to provide the flat strips or plates.

Other objects and advantages of the present invention will become more apparent upon reference to the following specification and annexed drawings, in which:

FIG. 1 is a diagrammatic view of semi-tubular members being processed into two flattened strips.

The left-hand view shows the holding furnace (1) and the mold (2).

As the semi-tubes are passed between four sets of two rollers (3-4-5-6), they are flattened.

For obtaining the necessary "bite", rollers of very large diameter would be necessary. To avoid this, four sets of rollers progressively roll flat the two semi-tubular members.

The right-hand of FIG. 1 shows the driving mechanism (7), the saw (8), used to cut the strips at the moment the two coils are filled, the two roll straightners (9) and the two coil winders (10).

Figure 2:
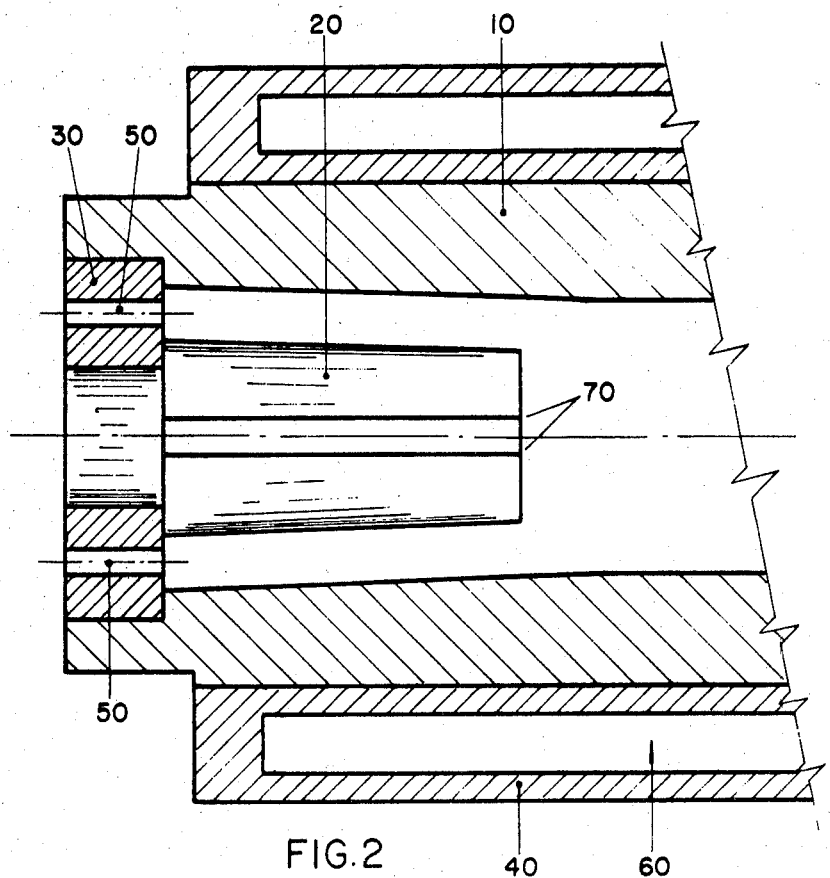
Figure 3:
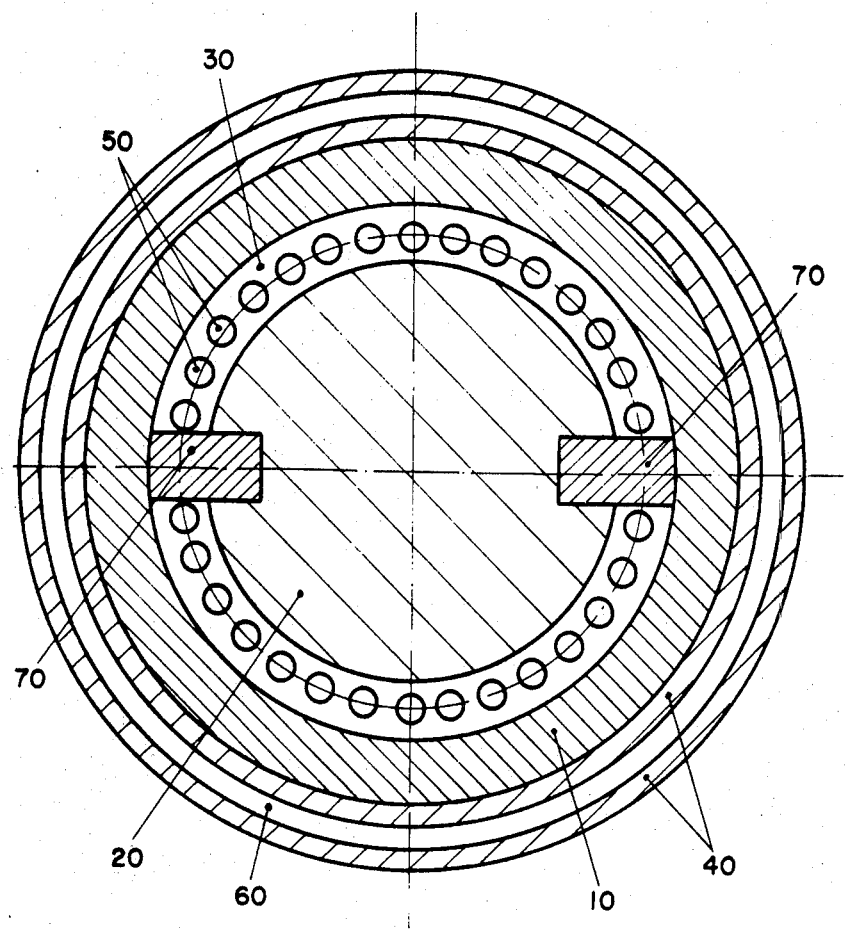
Figure 4:
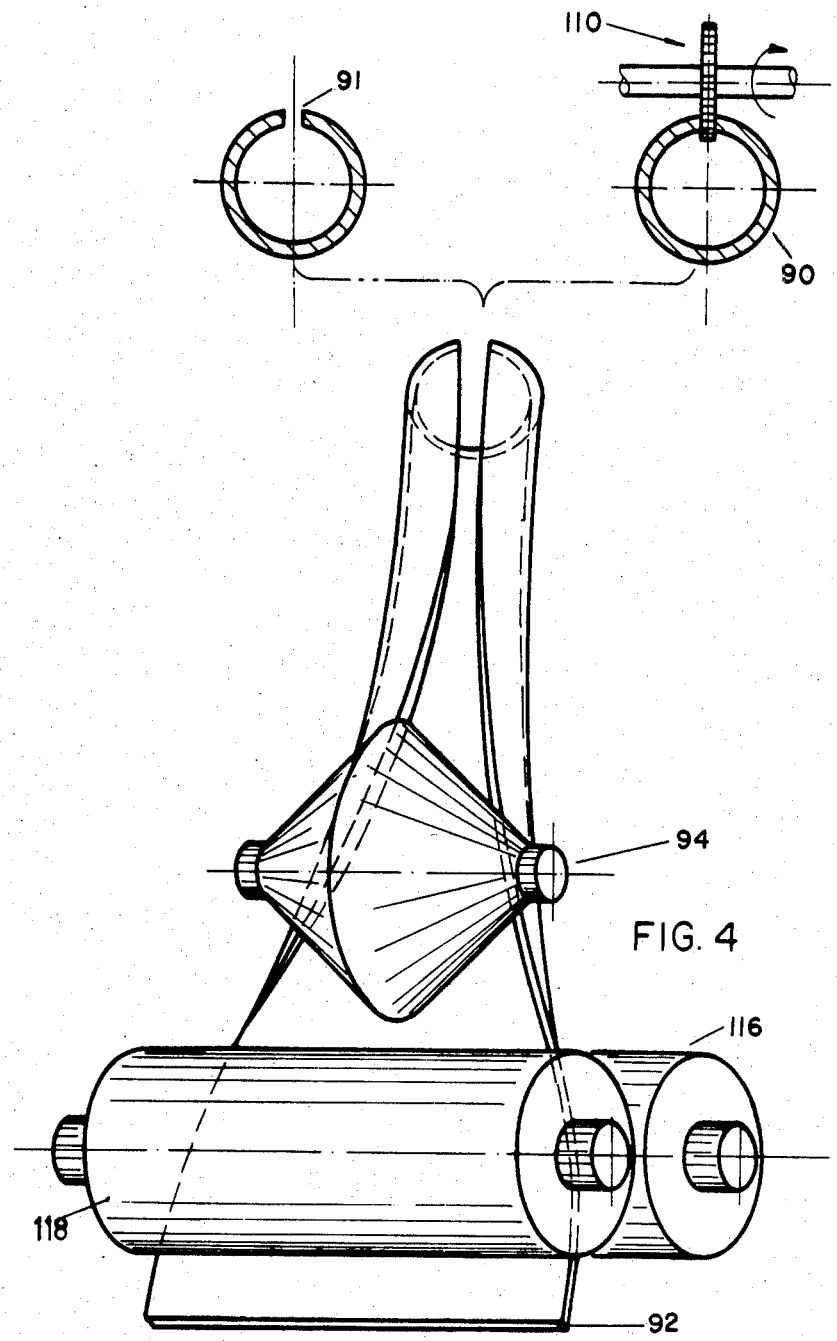
Figure 5:
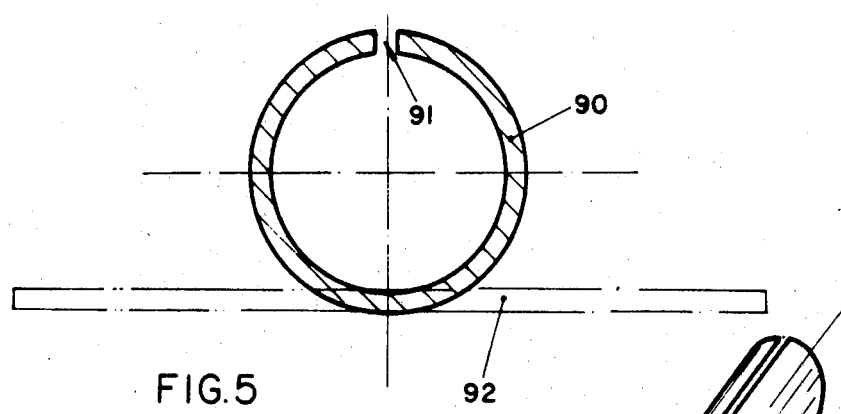
Figure 6:
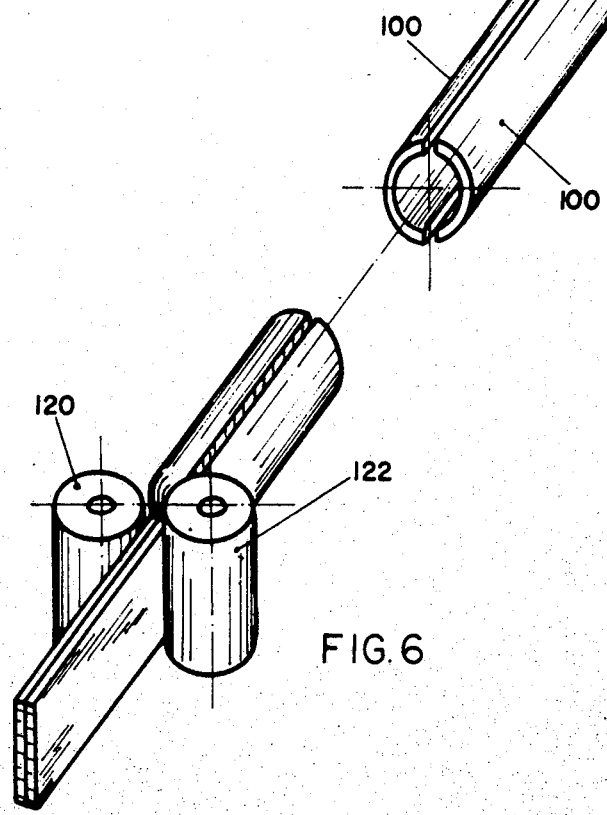
Figure 7:
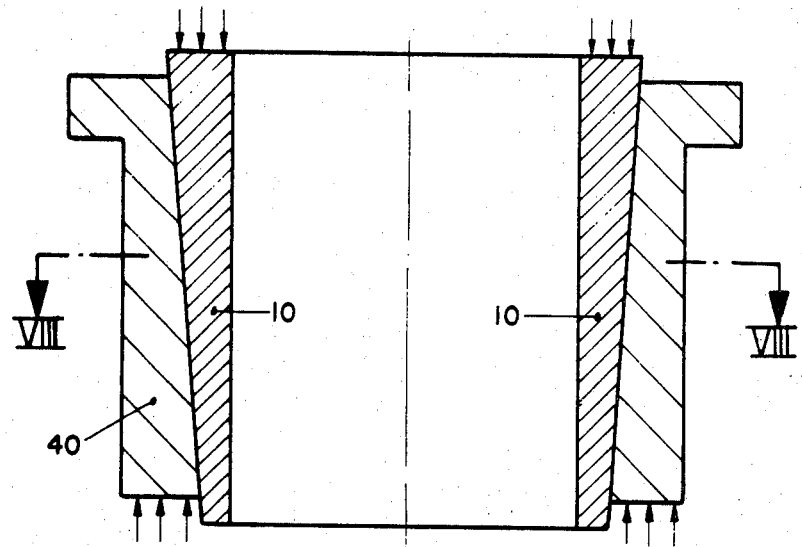
Figure 8:
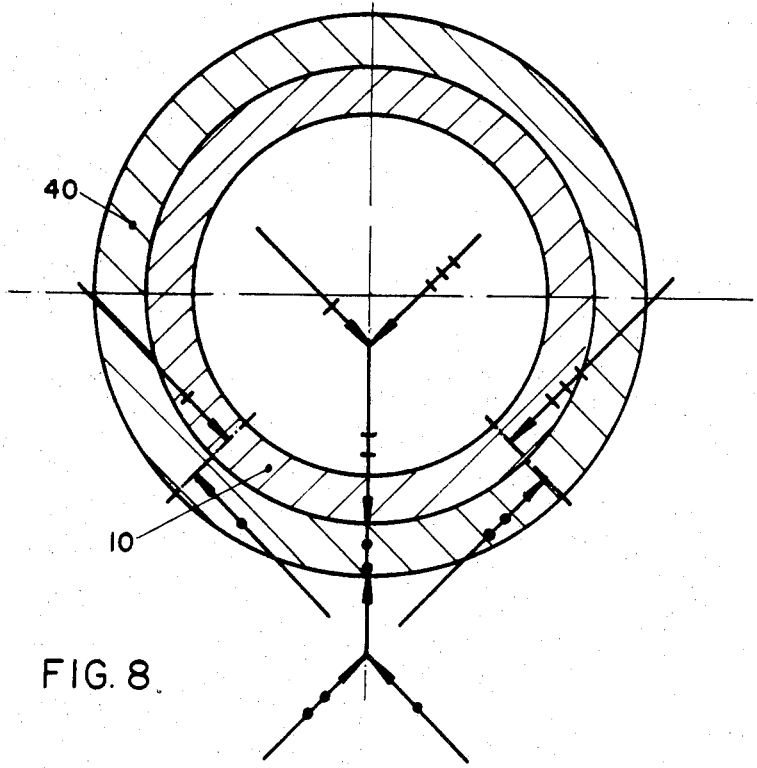

FIG. 2 shows the progressive roll flattening (3-4-5-6) of the two semi-tubes into two strips.

A basic point of the patent is the mechanism (7), which performs simultaneously the operations of withdrawal and flattening of the semi-tubular members.

The apparatus and process of the invention have particular advantages with respect to the continuous casting of non-ferrous metals such as copper, brasses, nickel, silver and aluminum alloys.

Various working examples of the invention are described below.

EXAMPLE 1

Metal—Deoxidized copper 99.9%, Phosphorus 0.02%
Furnace temperature—About 1180° C.
Number of strokes per minute—About 40
Length of stroke—About 1.5 mm

EXAMPLE 2

Metal—Brass (65% Cu–35% Zn)
Furnace temperature—About 1100° C.
Number of strokes per minute—About 12
Length of stroke—6 mm

EXAMPLE 3

Metal—Nickel-Silver, 55% Cu–18% Ni–27% Zn
Furnace temperature—About 1180° C.
Number of strokes per minute—About 12
Length of stroke—About 6 mm

EXAMPLE 4

Metal—Red brass (85% Cu–15% Zn)
Furnace temperature—About 1150° C.
Number of strokes per minute—About 12
Length of stroke—About 4.5 mm

EXAMPLE 5

Metal—Mn bearing Aluminum (1.2% Mn–98% Al)
Furnace temperature—About 750° C.
Number of strokes per minute—About 6
Length of stroke—About 10 mm In all of the foregoing examples, strips 13–15 mm thick have been very successfully cast.

These various examples are merely illustrative as there is a very large variety of metals and alloys which can be cast in this manner. The various factors such as furnace temperature, stroke frequency and stroke length, depend upon such things as the thickness of the tube to be cast, the particular metal or alloy being cast, etc. The apparatus and process can be used with a variety of metals but find particular usefulness in casting non-ferrous metals.

Typical strips which were manufactured in accordance with the present invention have been, after milling, 480 mm wide by 14 mm thick. It should be understood that any suitable width and thickness can be cast with the method and apparatus of the present invention. Strips as thin as 6 to 8 millimeters can be cast as semi-tubes.

The cylindrical die for casting the semi-tubular members is, to begin with, symmetrical in relation to its axis. Accordingly, the die and the jacket can be circular in form and uniform in cross-section. There are no corners or large sections as in a rectangular die. The circular die equalizes various mechanical forces, pressures, heat stresses etc. Thus, even with the high temperature differential, the circular die as well as the jacket maintain their circular shapes better, and, uniform contact between the two is achieved.

Full production runs, utilizing the die and method of the invention, have been carried on for more than 720 hours utilizing the same die. After the flat strip is formed, it can be further processed in any conventional way. Milling is only required over a relatively thin depth since the strips have good surface regularity and finish. Strips made in accordance with the invention have been cold-rolled down to a thickness of 0.1 mm without defects and requiring only a minor amount of milling.

I claim:

1. A method of continuously forming flat metal strips comprising the steps of:

continuously casting two semi-cylindrical members simultaneously from one circular die provided with a generally cylindrical mandrel extending into a cylindrical casting cavity defined by said die, said mandrel having external surface portions in contact with said cylindrical die thereby cooperating to define two semi-cylindrical cavities for casting said two semi-cylindrical members, continuously drawing the two semi-cylindrical members between a first set of rollers disposed downstream of said die with the rollers exerting pressure on exterior surfaces of said two members to press them together to form two flat metal strips, continuously withdrawing and separating the two flat metal strips by pulling on each of said strips by a respective second set of at least one pair of rollers arranged downstream of said first set of rollers, winding each said separated flat metal strip around a respective spool, and cutting the flat metal strips after winding to a preselected length with a cutting tool positioned between the first and second sets of rollers.

* * * * *